Sept. 19, 1933.  J. C. CONN  1,927,063
FILM SPLICING APPARATUS
Filed Dec. 1, 1931
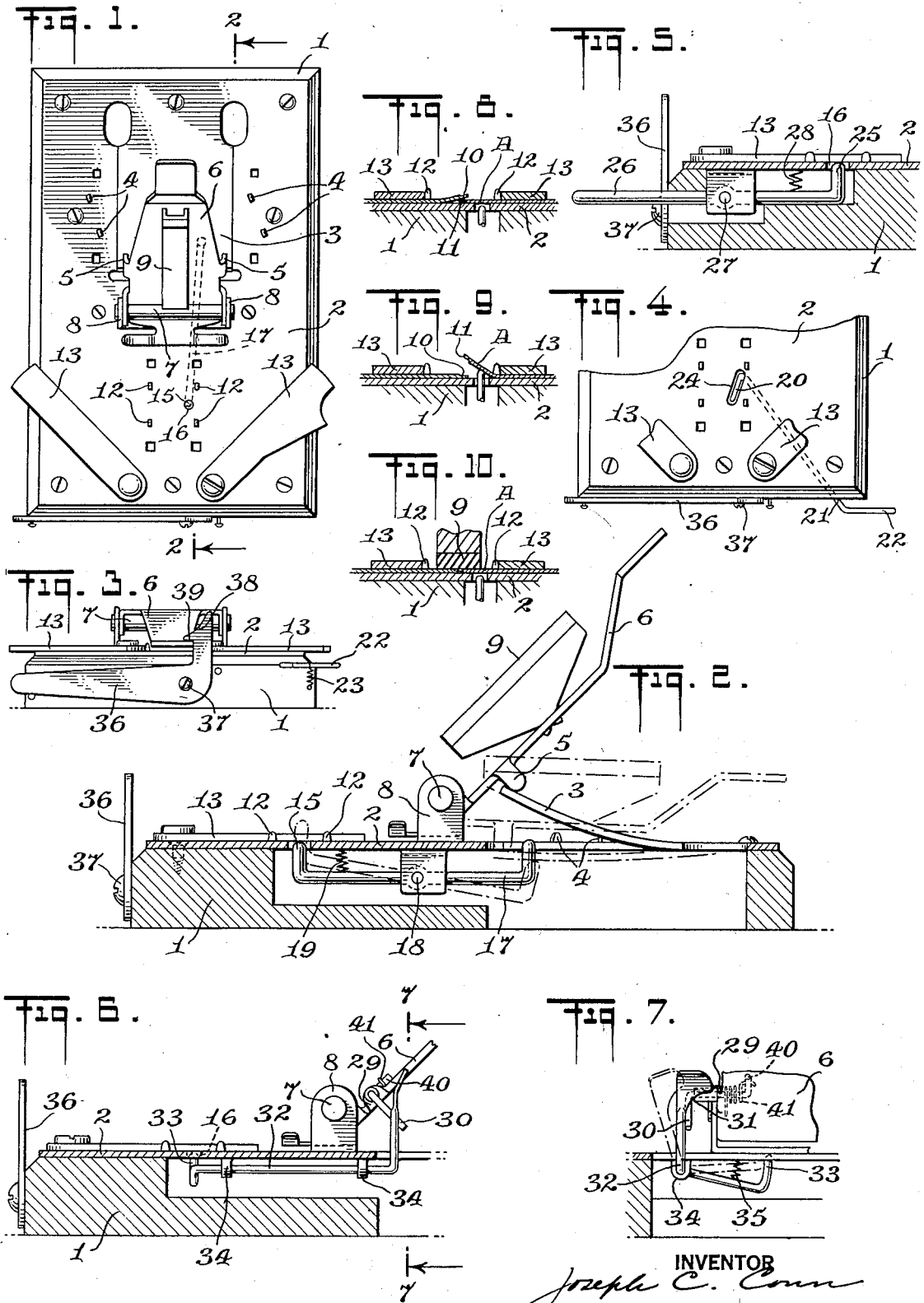
INVENTOR
Joseph C. Conn
BY
Janney Blair & Curtis
his ATTORNEYS Patented Sept. 19, 1933

1,927,063

UNITED STATES PATENT OFFICE 1,927,063

FILM SPLICING APPARATUS

Joseph C. Conn, Boonton, N. J.

Application December 1, 1931. Serial No. 578,255

3 Claims. (Cl. 154—42)

This invention relates to an improvement in devices for splicing films. It is customary in editing the products of motion picture photography to cut out portions of a film, or to divide a film and insert the whole or parts of other films. One type of so called film editing machine employed for this purpose includes in compact arrangement, a shearing device for cutting the film, a scraper by means of which the emulsion coating may be removed from a small area of each film or piece thereof adjacent to the ends to be joined, and mechanism for holding one of the scraped or otherwise suitably prepared end areas or portions in overlying or overlapping relation to the other scraped or prepared portion and exposed to receive a coating of an adhesive or suitable cement. Some film editing machines also include a pressing pad mounted on a pivoted arm and adapted to be moved into film end pressing position to complete the formation of a cemented joint between the film ends.

In using the above described form of editing machine, the operator, after shearing or cutting the film strip or strips, and preparing end areas thereof, places the ends to be joined in operative engagement with the holding devices and so that the scraped end area or portion of one end overlies or overlaps a similar area of the other end and is exposed to receive a coating of cement or the like. This is applied with a brush. The operator must now very quickly reposition the ends so that the scraped portion or area with the cement coating may be brought into effective contact with the uncoated scraped portion. Unless this is done very rapidly, the adhesiveness of the cement is impaired and the formation of an acceptable splice is prevented. Successful results therefore depend upon great rapidity and skill in manipulating the machine and the accessories ordinarily used in connection therewith. For example, after the coating of cement is applied, the operator lays aside the brush, picks up a film end lifting tool, such as a toothpick, knife blade or the like, inserts the point underneath the uncoated end, and lifts, bends, or deflects it to a position beyond the coated end, which, because of its resilience then snaps to its new position. When the lifter or tool is withdrawn by the operator from under the lifted or uncoated end, the inherent resilience thereof causes said end to snap into position with its scraped area in contact with the adhesive coated area of the other end. The operator then lays aside the lifter, seizes the handle or arm of the pressing mechanism, and moves it rapidly into pressing contact with the overlap of the two ends where it is held until the cement sets. If the operator has been sufficiently skillful or has worked fast enough, the joining will be successful. Otherwise, the effort is unsuccessful and the work has to be done all over again, sometimes with the loss of valuable portions of the film.

An object of my invention has been to provide a film end splicing device in the use of which even by an inexpert operator repositioning of the film ends after application of the cement coating may be effected so readily and in so short a time that no substantial impairment of the adhesiveness of the cement can take place. A further object of my invention has been to provide improved film end repositioning instrumentalities in combination with suitable means for holding the film ends in position to be reset and/or in combination with suitable means for pressing the film ends together after they have been repositioned. Various embodiments of my invention are illustrated in the drawing appended to the present specification and in which:—

Figure 1 is a top plan view of a form of film editing apparatus with my improvement applied thereto;

Figure 2, a longitudinal section on the line 2—2 of Figure 1;

Figure 3, a front end view of a modification;

Figure 4, a top plan view thereof;

Figure 5, a further modification in which the film deflector rises substantially vertically through an opening in the platen below the film;

Figure 6, a further modification in which the forward or pressing movement of the pressing pad is caused to actuate the film deflector;

Figure 7, a fragmentary detail showing a rear end view of the deflector actuating means illustrated in Figure 6;

Figure 8, a fragmentary diagrammatic view illustrating the relative positions of the film ends prior to deflection;

Figure 9, a similar view illustrating the relative positions of the film ends during deflection; and Figure 10, a similar view illustrating the relative positions of the film ends after they have been deflected and reversed and the pressing pad has been brought into operative engagement therewith.

Referring to the drawing, one embodiment of my invention may advantageously be incorporated in a film editing apparatus comprising a base 1 of wood or other suitable material upon which is mounted a platen 2. A rearwardly disposed portion of the platen is arranged and adapted to provide a shear or cutter 3, at each side of which are located film positioning pins or guides 4 adapted to extend through the usual perforations occurring in moving picture films. With the positioning pins arranged in the relation to the shear or cutting device 3, as shown, the film ends are cut diagonally, as is well understood although they may be cut straight across or otherwise if desired. The cutter 3 is actuated by lugs 5 on arm 6 pivotally mounted at 7 on spaced brackets 8 and which also carries a pressing pad 9.

After the film ends have been cut as desired, they are scraped or prepared in any suitable manner to form the contact or lap surfaces 10 and 11 respectively, Figure 8. Film positioning pins or guides 12 are located adjacent to a forward portion of the platen and serve in part to retain the film ends in position for one of them to receive the cement coating and then to be pressed against the other by the pressing pad 9. The apparatus also includes pivoted clamps 13 which, when the film perforations operatively engage the pins 12, are swung forwardly and into operative film clamping position against said pins, as shown in Figures 8, 9 and 10. The film ends are thus held securely against movement in any direction except such as may be desired to be imparted thereto by my repositioning means after the cement has been applied.

As shown in Figures 1 and 2, one form of my film repositioning apparatus includes a film end deflector 15 positioned to operate through an opening 16 in the platen 2, said opening being located to admit the deflector underneath the non-adhesive film end A, Figure 8. The deflector 15 is mounted at one end of lever 17 pivotally mounted at 18 underneath the platen 2. The other end of the lever 17 is positioned and adapted to be engaged by a downwardly moving part of the apparatus when the arm 6 is deflected rearwardly. As will be apparent from Figure 2, this rearward motion of arm 6, causes the rear end of lever 17 to move downwardly, while the forward end carrying the deflector 15 moves upwardly. This swings the deflector against the underside of and displaces the film end A as indicated in Figure 9. The spring 19 is arranged and adapted to restore the deflector 15 and its co-operating parts to normal retracted position as soon as the arm 6 is raised sufficiently to disengage the rear end of lever 17.

In the form of device shown in Figure 3 and 4, the deflector is shown as the bent over end 20 of a length of wire 21 extending below the platen 2 and having its outer end 22 exposed in position to be engaged by the hand of the operator at will. A spring 23 restores the arm 22 and the deflector 20 to normal inoperative position after use. In this modification, the opening in the platen 2 takes the form of a slot 24 through which the deflector moves in an arc, imparting a simultaneous wiping and deflecting motion to the film end A.

Another modification is shown in Figure 5 wherein a deflector 25 is mounted on the hand operated lever 26 fulcrumed at 27. The platen is provided with an opening 16, as in the form shown in Figure 1, and a spring 28 restores the parts to normal position after the deflector has been actuated by pressing upon or striking the outer free end of the lever arm 26.

In the modification shown in Figures 6 and 7, deflection of the film end is accomplished simultaneously and automatically with the forward movement of the arm 6. For this purpose, the latter has an extension or bracket 29 on which is fulcrumed a lever with its free end forming a rearwardly projecting pin 30. A deflector 33, operating through hole 16 in the platen 2, as in the embodiment shown in Figures 1 and 5, forms the forward end of a wire 32 which is supported in bearing brackets 34, the rear end of said wire being flattened and having a curved edge 31 arranged in the path of pin 30. Rocking motion is imparted to said wire and to the deflector 33 to swing it upwardly when the arm 6 is moved forwardly to apply the pressing pad 9 to the joint between the film ends, as will be better understood from the showing in Figure 7. As there indicated, the pin 30, moving upwardly and forwardly with arm 6 rides along the curved edge 31 and at the same time presses the rocking member to the left until the pin passes beyond and disengages said edge 31, whereupon wire 32 and deflector 33 are automatically returned to normal position by means of a suitable spring, as 35, where they remain during pressing operation of the presser pad and while the latter is locked in the position indicated in Figures 3 and 10, by a latch 36 pivoted at 37. As shown in Figure 3, the latch 36 has a head provided with an inclined upper surface 38 which is encountered by the forward end of arm 6 in the last portion of its down or pressing stroke. This displaces the upper end of the latch laterally while the forward end of arm 6 passes to its lowermost position. Thereupon the latch 36 rocks back toward normal position and the hook 39 engages and holds the arm 6 in position to press pad 9 securely against the film end joint.

Referring further to the modification illustrated in Figures 6 and 7, I have also provided an arrangement of parts whereby operation of deflector 33 is prevented upon the return or rearward movement of the arm 6. For this purpose, the flattened end portion of the wire rod 32, which, as seen in Figure 7 lies in the path of the projecting pin 30, is inclined rearwardly in such manner that when said pin moves rearwardly and downwardly with arm 6, its end engages and is yieldingly deflected as it moves past said flattened inclined portion to its initial position or such that upon the next forward and upward movement of the arm 6, the pin 30 will again operatively engage the curved edge 31 as previously described.

The above described yielding engagement between the flat end of rod 32 and the pin 30 upon return movement of the latter may obviously be accomplished by various expedients. In the embodiment shown in Figures 6 and 7, the pin 30 is part of a rocking lever fulcrumed in the bracket 29 and having an arm 40 normally pressed against a portion of the arm 6 by a spring 41. In this position arm 40 acts as a detent to limit or fix the normal position of pin 30. During return movement of said pin as above described it encounters the flat end of rod 32 and yields against resistance of spring 41 as it passes said flat end, it being understood that one end of spring 41 presses against arm 40 while the other end bears against the arm 6.

From the foregoing description and statement of mode of operation of the various embodiments of my invention, it will be apparent that I have provided improved apparatus for expediting the repositioning or reversing of the film ends after application of the adhesive to one of them and just before the ends are pressed into contact to form a permanent joint. Although the automatic repositioning device illustrated in Figures 6 and 7 may normally be expected to perform most advantageously in respect to speed of operation, nevertheless, the alternative embodiments afford a greatly simplified form of splicing practice as compared to that involving the use of a hand held film lifting tool.

I claim:—

1. In a device for splicing films, the combination of means for supporting film ends with a portion of one of said ends overlapping a portion of the other and exposing a surface in position to receive an adhesive coating, means for pressing overlapping portions of said ends together, and means operatively connected to said pressing means and movable therewith to bend said other end in one direction toward and past said first mentioned end and to permit said other end to return in the opposite direction to a position overlapping a portion of the previously exposed surface of the first mentioned end.

2. In a device for splicing films, the combination of means including a platen for supporting film ends with a portion of one of said ends overlapping a portion of the other and exposing a surface in position to receive an adhesive coating, means for pressing overlapping portions of said ends together and against the platen including a movable presser, and means operatively connected to said presser and actuated by movement thereof toward the platen to deflect said other film end toward and past said first mentioned film end and to permit said other film end to return in the opposite direction to a position in overlapping relation to a portion of the previously exposed surface of the first mentioned end before the presser engages said overlapping ends and presses them against the platen.

3. In a device for splicing films, the combination of means including a platen for supporting film ends with a portion of one of said ends overlapping a portion of the other and exposing a surface in position to receive an adhesive coating, means for pressing overlapping portions of said ends together and against the platen including a movable presser, and means operatively connected to said presser and actuated by movement thereof away from the platen to deflect said other film toward and past said first mentioned film end and to permit said other end to return in the opposite direction to a position in overlapping relation to a portion of the previously exposed surface of the first mentioned end.

JOSEPH C. CONN.